(12) United States Patent
Nydahl

(10) Patent No.: US 9,776,110 B2
(45) Date of Patent: Oct. 3, 2017

(54) FILTER AND METHOD FOR FILTRATION OF HYDRAULIC OIL IN A RETURN LINE TO A HYDRAULIC TANK, AND A DRILLING RIG COMPRISING THE FILTER

(75) Inventor: Anders Nydahl, Filipstad (SE)

(73) Assignee: Atlas Copco Rock Drills AB, Orebro (SE)

( * ) Notice: Subject to any disclaimer, the term of this patent is extended or adjusted under 35 U.S.C. 154(b) by 1174 days.

(21) Appl. No.: 13/261,246

(22) PCT Filed: Nov. 3, 2010

(86) PCT No.: PCT/SE2010/051192
§ 371 (c)(1),
(2), (4) Date: Mar. 28, 2012

(87) PCT Pub. No.: WO2011/065891
PCT Pub. Date: Jun. 3, 2011

(65) Prior Publication Data
US 2012/0181234 A1    Jul. 19, 2012

(30) Foreign Application Priority Data
Nov. 24, 2009   (SE) .................................... 0950893-8

(51) Int. Cl.
*B01D 29/11* (2006.01)
*B01D 29/60* (2006.01)
(Continued)

(52) U.S. Cl.
CPC .......... *B01D 29/114* (2013.01); *B01D 29/115* (2013.01); *B01D 29/605* (2013.01);
(Continued)

(58) Field of Classification Search
CPC .. B01D 35/147; B01D 29/114; B01D 29/115; B01D 29/15; B01D 29/17; B01D 29/23; B01D 29/25; B01D 29/31; B01D 29/33; B01D 29/336; B01D 29/35; B01D 29/356; B01D 29/605; B01D 27/10; B01D 27/103; B01D 2201/48; B01D 35/1435; F16K 37/00
(Continued)

(56) References Cited

U.S. PATENT DOCUMENTS 2,707,562 A *  5/1955  Walter ........................ 210/130
2,998,138 A *  8/1961  Downey et al. .............. 210/90
(Continued)

FOREIGN PATENT DOCUMENTS

DE      2429510       1/1976
DE     19515962      10/1996
(Continued)

*Primary Examiner* — Lucas Stelling
(74) *Attorney, Agent, or Firm* — Mark P. Stone

(57) ABSTRACT

A filter (5) for a return line (L1, L2) for hydraulic oil to a hydraulic tank (2), which filter (5) has a filter element (11). The filter (5) is arranged to filter the hydraulic oil through the filter element (11) when the hydraulic oil is below a first oil level (H1) in the filter (5), and the filter (5) has an arrangement (15) to cause the hydraulic oil to bypass the filter element (11) when the oil level (H) in the filter (5) exceeds the first oil level (H) without causing any significant back pressure.

12 Claims, 3 Drawing Sheets

(51) Int. Cl.
*B01D 35/143* (2006.01)
*B01D 35/147* (2006.01)
*F15B 21/04* (2006.01)

(52) U.S. Cl.
CPC ....... *B01D 35/147* (2013.01); *B01D 35/1435* (2013.01); *B01D 2201/48* (2013.01); *F15B 21/041* (2013.01)

(58) Field of Classification Search
USPC ........................................................ 210/744
See application file for complete search history.

(56) References Cited

U.S. PATENT DOCUMENTS 3,525,404 A * 8/1970 Kelly, Jr. et al. ................ 173/4
3,750,888 A * 8/1973 Rinaldo ..................... 210/172.6
7,243,740 B2   7/2007 Frith

FOREIGN PATENT DOCUMENTS

| GB | 735368 | 8/1955 |
| WO | WO 96/25995 | 8/1996 |
| WO | WO 2009/050752 | 4/2009 |

* cited by examiner

FILTER AND METHOD FOR FILTRATION OF HYDRAULIC OIL IN A RETURN LINE TO A HYDRAULIC TANK, AND A DRILLING RIG COMPRISING THE FILTER

TECHNICAL AREA

The present invention relates to a filter according to the introduction to claim 1.

THE PRIOR ART

In a hydraulic system, such as a drilling rig, hydraulic oil is returned in return lines to a hydraulic tank. Hydraulic oil from most of the hydraulic components in the hydraulic system passes through a return filter on its way back to the hydraulic tank. This filter is often of a type that has a pressure-based bypass function.

A number of hydraulic components, however, require separate return lines of internally leaking hydraulic oil directly to the hydraulic tank, without passing a return filter, since the return line must be "free of pressure", i.e. it must have normal atmospheric pressure without any significant back pressure. It would be possible, otherwise, for such back pressure from, for example, a filter to change the function of, for example, a valve or to cause failure of a hydraulic pump. The hydraulic pump, in particular, is very sensitive to back pressure, since the housing of the pump with its bearings, pistons, etc. will be placed under pressure. An increased housing pressure influences the pistons such that they loose contact with the sliding plate of the hydraulic pump, thus causing pump failure. The limit for the back pressure that the manufacturers allow may lie at approximately 0.5-2 bar above the pressure that is present in the suction line of the hydraulic pump, but the manufacturers prefer the pressure to be lower than this and for this reason advise against the installation of return filters.

The return line of a variable hydraulic pump must be dimensioned taking into consideration the small volume of oil that the adjusting piston presses out into the return line in the short period (25-100 ms) during which the hydraulic pump changes the displacement. The volume of oil removed in the return line thus corresponds to a large value of the flow, specified in liter/min.

The prior art technology for avoiding back pressure in the return lines for the hydraulic components that are sensitive to back pressure is solely the direct routing of the return lines from the said hydraulic components and the leakage connections to the hydraulic tank and its leakage connections, without passing the return filter of the hydraulic tank.

One problem when using the prior art technology is that the hydraulic oil from the hydraulic components that are sensitive to back pressure does not pass through a return filter, and thus the hydraulic oil is not filtered. This means, among other things, that particles from, for example, the slide bearings and roller bearings of the hydraulic pump pass directly to the hydraulic tank without being filtered out. The particles then accompany the hydraulic oil back into the hydraulic system and to the hydraulic components that constitute it, and generate further particles through wear, leading to disturbance of function and abnormal wear. The cleaning of the hydraulic system that is required after pump failure is extensive. It is difficult also to obtain complete elimination of the particles that have been distributed throughout the hydraulic system without exchanging the hydraulic component involved. Remaining particles will, in the worst case, cause problems in the hydraulic system in the future.

DESCRIPTION OF THE INVENTION

According to one aspect of the invention, a filter is presented with the characteristics specified in claim 1.

The advantage is that filtration is carried out without the filter causing any significant back pressure, not even in the event of temporarily high leakage flows of hydraulic oil, since a level-based bypass function can be used in the filter. The filter can thus be used for hydraulic components that are sensitive to back pressure. The invention would, for example, in the event of bearings failure in a hydraulic pump capture the particles from the failure that have been transported from the leakage line of the hydraulic pump in to the hydraulic tank. It would otherwise be possible for these particles to be sucked into the hydraulic pump and in this way further damage it, and to be distributed again through the hydraulic system and damage other hydraulic components. The collateral damage following pump failure, and thus also the extent of the cleaning of the hydraulic system required, are minimised through the invention.

DESCRIPTION OF DRAWINGS

The invention will be described in more detail with the aid of a preferred embodiment and with reference to the attached drawings, of which

PREFERRED EMBODIMENT

Figure 1:
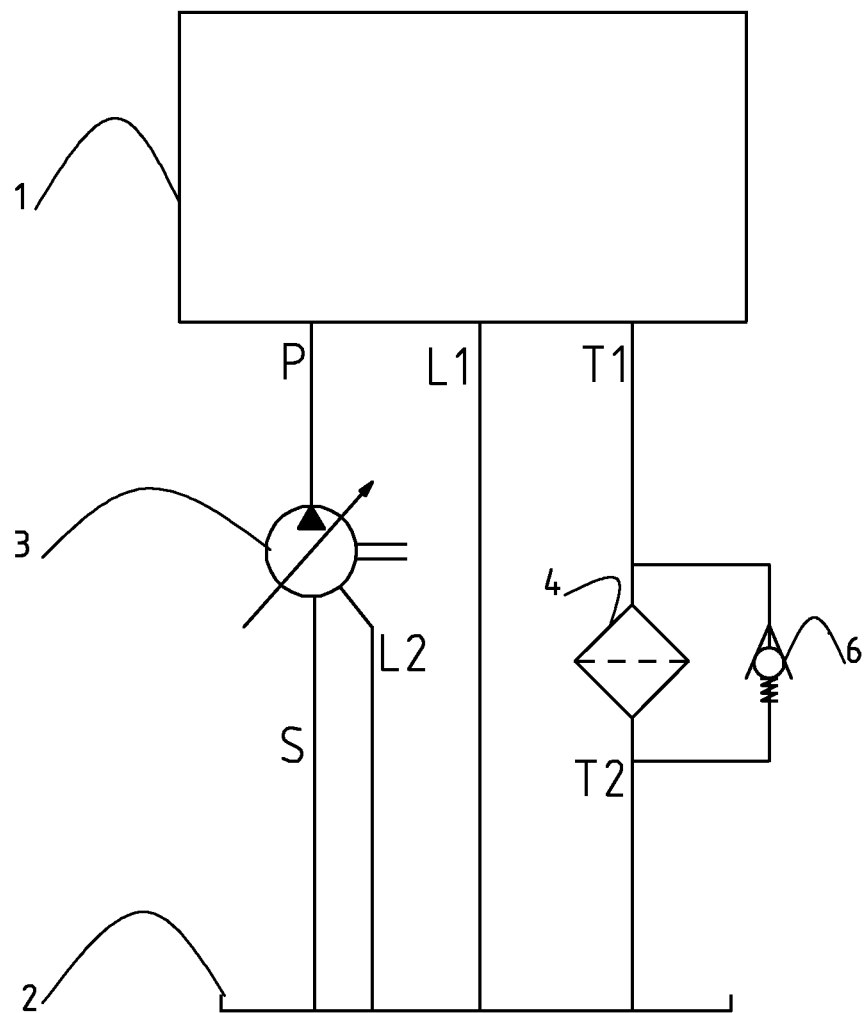
FIG. 1 shows an overview of a prior art hydraulic system in a drilling rig.

FIG. 1 shows an overview of a prior art hydraulic system 1 comprising a number of different hydraulic components in a drilling rig with at least one drilling machine. The hydraulic system 1 is connected to a hydraulic tank 2. One or several hydraulic pumps 3 pump hydraulic oil through one or several suction oil lines S from the hydraulic tank 2 to the hydraulic pump 3 and through one or several pressurised lines P from the hydraulic pump 3 to the hydraulic system 1. Most of the hydraulic oil then returns through one or several first return lines T1, T2 from the hydraulic system 1 to a first return filter 4 and from the first return filter 4 to the hydraulic tank 2. The first return filter 4 may be of a conventional type with a pressure-based bypass function 6, which means that the oil in the first return lines T1, T2 is led past the first return filter 4 if the pressure in the first return filter 4 becomes too high.

Certain hydraulic components, in particular hydraulic pumps 3, are sensitive to the back pressure that a conventional return filter 4 with a pressure-based bypass function 6 can cause. This is particularly the case for a drilling rig, in which what is known as a full-flow filter is often used as return filter 4, while at the same time the return flow of hydraulic oil can be 200-600 l/min, which is the reason that a relatively high back pressure may be created. The hydraulic components 3 that are sensitive to back pressure, therefore, have a return flow connected directly to the hydraulic tank 2 through second return lines L1, L2, without a conventional return filter 4. It is most often a case of leakage oil flows.

Figure 2:
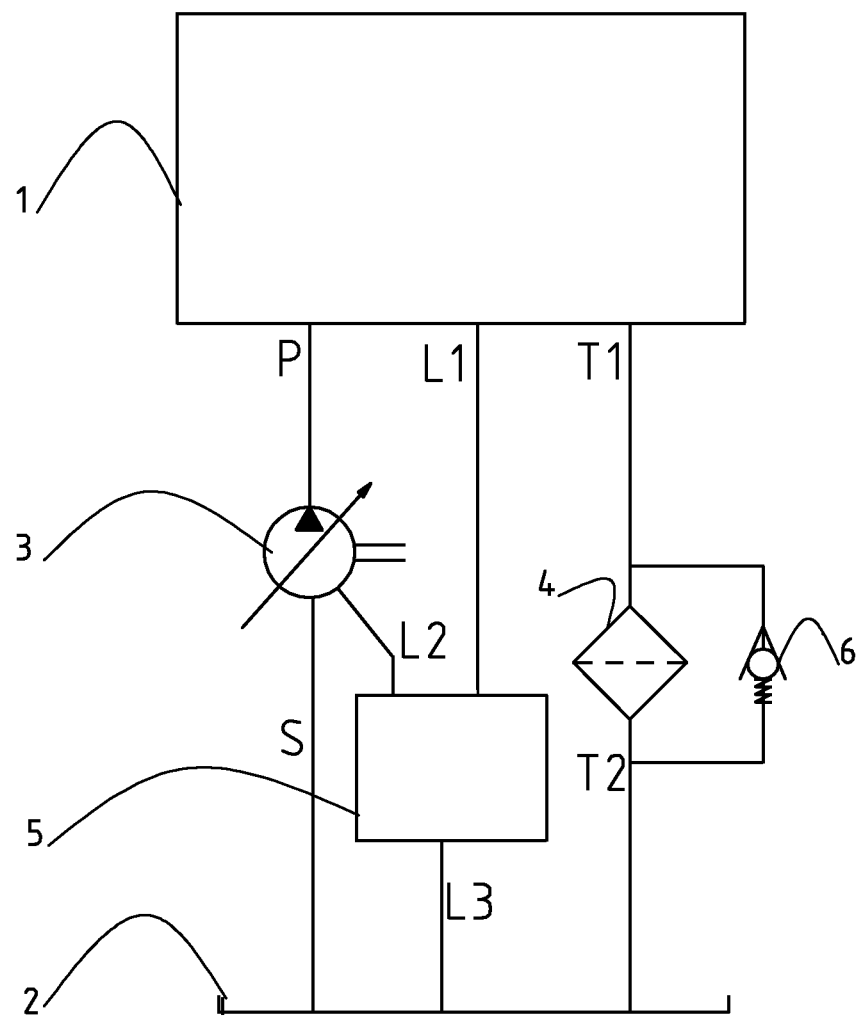
FIG. 2 shows an overview of a hydraulic system in a drilling rig according to the invention.

FIG. 2 shows an overview of a hydraulic system in a drilling rig according to the invention where one or several second return filters 5 are arranged for the second return lines L1, L2 and with one or several additional second return lines L3 between the second return filter 5 and the hydraulic tank 2. The second return filter 5 has a level-based bypass function that will be described in more detail below using an embodiment. In practice, the second return filter 5 may be integrated into the hydraulic tank 2 or it may be separate from the hydraulic tank 2.

Figure 3:
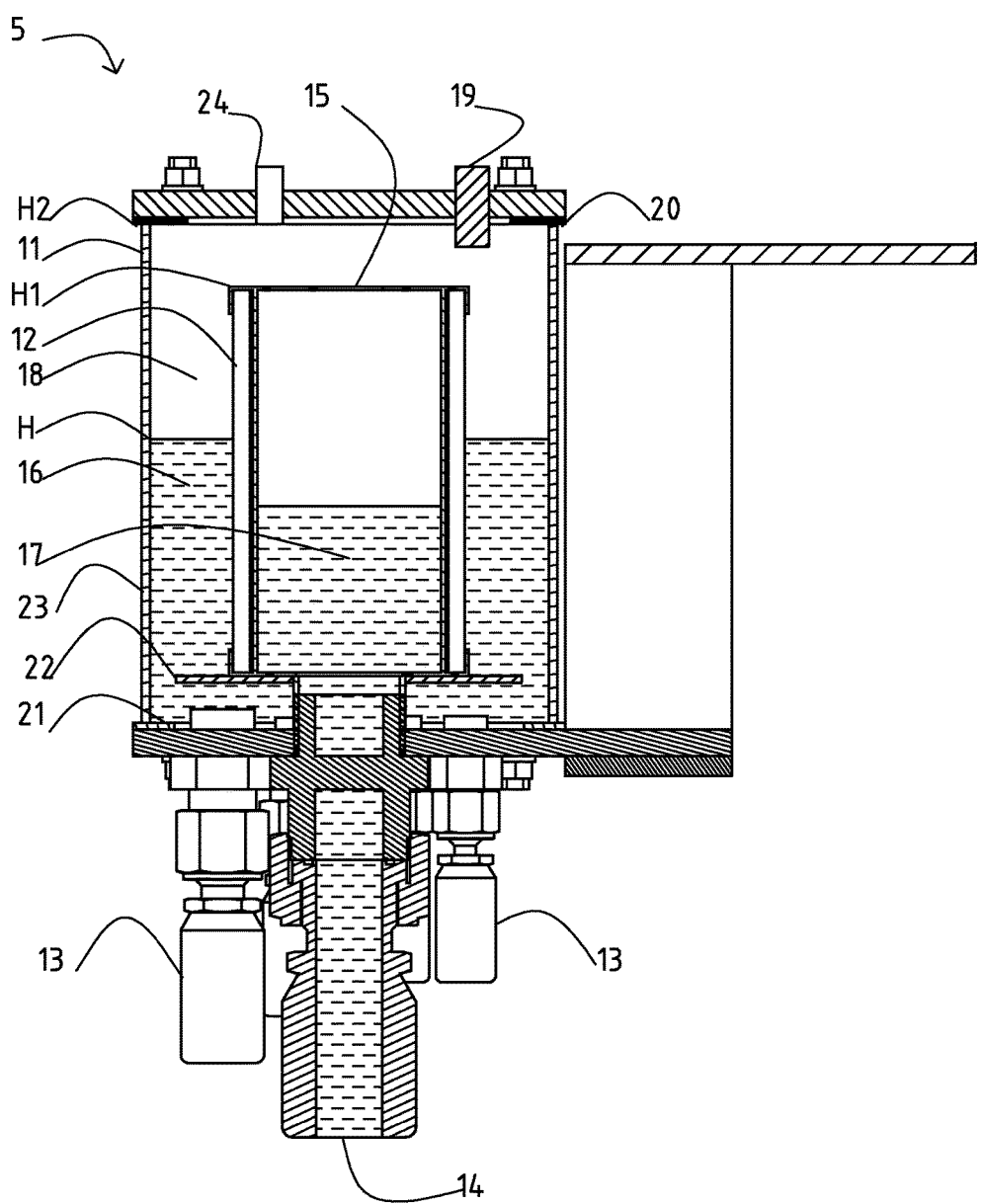
FIG. 3 shows a cross-section of a filter according to one embodiment.

FIG. 3 shows an embodiment of the second return filter 5. The second return filter 5 comprises a filter holder 11, one or several filter elements 12, one or several inlets 13 in to the filter holder 11, one or several outlets 14 from the filter holder 11 and one or several openings 15. The filter element 12 is arranged for the filtering of oil between the inlet 13 and the outlet 14. The opening 15 is arranged as a filter-free passage between the inlet 13 and the outlet 14.

The filter element 12 may have any one of several appearances. The most simple model of the filter element 12 may be a straight wall between the inlet 13 and the outlet 14 with an opening 15 in the form of an open area above it. The greatest advantage, however, is obtained with a filter element 12 that has the form of a cylinder, since this has the greatest filtration area. It is advantageous to have a wavy edge of the filter element 12, in order to further increase this filtration area. The filter element 12 should be sufficiently finely masked to capture as many particles as possible, but not so finely masked that the flow through the filter element 12 becomes too slow. A suitable grade for the filter is, for example, 100 μm absolute.

FIG. 3 shows that the inlet 13 to the second return filter 5 is arranged on the outer surface of a filter element 12 with the form of a cylinder, while the outlet 14 is arranged on the inner surface of the filter element 12 for filtration from the outside inwards, but it is equally possible to exchange the locations of the inlet 13 and the outlet 14, such that filtration occurs instead from the inside outwards.

Hydraulic oil from the return lines L1, L2 of the hydraulic components that are sensitive to back pressure is led into the filter holder 11 through the inlet 13 of the filter holder. The hydraulic oil does not normally arrive at a steady rate of flow: it can vary wildly over time. When an addition is made to the volume of oil of the filter holder 11 with its unfiltered hydraulic oil 16, an oil level H of the unfiltered hydraulic oil 16 rises. At the same time, the filter element 13 allows the passage of an amount of hydraulic oil 17 and filters this amount, which is led out from the filter holder 11 through its outlet 14 and return lines L3 to the hydraulic tank 2.

The ratio between the inflow of unfiltered hydraulic oil 16 into the filter holder 11 and the outflow of filtered hydraulic oil 17 from the filter holder 11 determines the volume of the unfiltered hydraulic oil 16 and thus the level H. If the inflow increases rapidly relative to the outflow, as may occur, for example, following a sudden change in the displacement of the hydraulic pump 3, the oil level H rises and the volume of free air 18 above the hydraulic oil 16, 17 is reduced. The filter construction accumulates the short-term increases in volume in the filter holder 11 and carries out full filtration without creating any significant back pressure in the leakage lines L1, L2.

Full filtration is achieved as long as the increasing inflow creates an oil level H that is lower than a first level H1, which corresponds to the height of the filter element 12 to the opening 15. If the inflow increases further, the excess incoming unfiltered hydraulic oil 16 is led through the opening 15 of the filter element and onwards through the outlet 14 of the filter holder 11 to the hydraulic tank 2, without being filtered and without creating any significant back pressure. A filter 5 with a level-based bypass function has in this case been achieved, instead of a conventional pressure-based bypass function.

It is an advantage that the filter holder 11 be transparent, such that it is easy to see what is happening inside the filter. It is even more advantageous to install a level sensor 19, for example an electrical level sensor, in order to measure the oil level H. If the oil level H in the filter holder exceeds the first level H1, which is the limit for full filtration, the system can carry out at least one of raising an alarm and switching off necessary components, which for a drilling machine probably is the complete drilling machine. This is to avoid unfiltered hydraulic oil 16 from the second return lines L1, L2 returning to the hydraulic tank 2. The alarm may in this case be an indication that the filter must be exchanged or cleaned.

If the oil level H continues to rise above the first level H1 and the opening 15 is not sufficient to deal with the inflow of unfiltered oil 16, there is a risk that the oil level H will rise to a second level H2, which in FIG. 3 corresponds to the ceiling 20 of the filter holder. A pressure will in this case build up in the filter holder 11, which pressure will create an undesired back pressure in the leakage lines L1, L2, which risks destroying hydraulic components. The level sensor 19 can in this case raise an alarm and switch off necessary components.

Thus, it may be an alternative to raise an alarm and switch off already at the first level H1 in order to prevent any significant amount of unfiltered oil 16 from passing the filter. A further alternative may be only to raise an alarm at the first level H1, while both raising the alarm and switching off take place at the second level H2 in order to avoid back pressure in the leakage lines L1, L2. A variant of the first alternative can be to keep the opening 15 normally closed, and to open it when the level sensor 19 raises an alarm. It may be advantageous to use the most recent alternative in an environment in which the filter is, for example, exposed to much shaking, and there is otherwise a risk that unfiltered oil will splash into the opening 15.

If a large inflow of unfiltered hydraulic oil 16 occurs suddenly and the inlet 13 is located in the floor of the filter holder, the unfiltered hydraulic oil 16 may splash up onto the ceiling 20 of the filter holder, even though the filter holder 11 is not full, and in this way possibly cause a false alarm for too high a level H1, H2. Alternatively, or in addition to this, an amount of unfiltered hydraulic oil 16 may splash out through the opening 15. It may for this reason be advantageous with an obstacle 22 at the inlet 13 that ensures that the unfiltered hydraulic oil 16 is forced to take a slight deviation and thus behave more calmly. It is, of course, possible to arrange corresponding obstacles 22 as in FIG. 3 at the inlet 13, if the inlet 13 is instead positioned on the inner surface of the filter element 12—for filtration from the inside outwards—or if the inlet 13 is, for example, located in the ceiling 20 or the wall 23 of the filter holder.

The air 18 in the filter holder 11 influences the outflow of hydraulic oil 17 from the filter holder 11. Since the amount of hydraulic oil 16, 17 in the filter holder 11 can vary in an undesired manner, the air pressure will be affected if the filter holder 11 is hermetically sealed. The air pressure will, for example, fall if more hydraulic oil flows out from the filter holder 11 than flows in to the filter holder 11, and it is therefore possible for hydraulic oil 16, 17 to be trapped inside the filter holder 11. In order to avoid large changes in air pressure, the air 18 can be placed in contact with, for example, the air in the hydraulic tank 2 through, for example, a nipple 24. The same air pressure is then obtained in the filter holder 11 as in the hydraulic tank 2, which today lies at a pressure 0-0.2 bar above atmospheric pressure. This leads to improved flow between the second return filter 5 and the hydraulic tank 2. It is possible, naturally, to equalise the pressure using other methods.

The small back pressure that arises from the return filter 5 is principally caused by two factors: the oil level H in the filter holder 11 and the air pressure in the air 18 above the oil. Experiments have shown that it is sufficient in a drilling rig to have a first level H of approximately 133 mm, which would give a back pressure of approximately 0.01 bar from the oil level. This is negligible in this context. As has been mentioned above, the air pressure can give a maximum back pressure of 0.2 bar, which would have arisen also if the return lines L1, L2 had been connected directly to the hydraulic tank 2 according to prior art technology and which lies far below the limit of 0.5 bar set by the manufacturers.

It has been described above principally how the second return filter 5 is used for leakage oil from, for example, hydraulic pumps 3. It is, however, naturally possible to use the second return filter 5 for any return oil at all—including return oil from hydraulic components that can withstand back pressure: it is simply necessary to dimension the return filter 5 accordingly. It is possible also not to use a first return filter 4, and allow the second return filter 5 to deal with all return oil.

The invention is, naturally, not limited to the example described above: it can be modified within the scope of the attached patent claims.

The invention claimed is:

1. A filter for a return line for hydraulic oil to a hydraulic tank, which filter comprises a filter element, wherein the filter is arranged to filter the hydraulic oil through the filter element when the hydraulic oil is below a first oil level in the filter and, wherein the filter comprises a level based bypass arrangement for causing the hydraulic oil to bypass the filter element when the oil level in the filter exceeds the first oil level, said bypass arrangement comprising an opened top without a valve defined at a predetermined position in said filter element at or above said first oil level, said filter further comprising an arrangement for equalizing the pressure of air in an air compartment in the filter for carrying out the level based bypass arrangement without causing any significant back pressure by leading the hydraulic oil to bypass the filter element through the opening therein.

2. The filter according to claim 1, wherein the filter further comprises an arrangement to carry out at least one of raising an alarm and switching off components if the oil level exceeds the first oil level or a second oil level, or both.

3. The filter according to claim 2, wherein the arrangement for carrying out at least one of raising an alarm and switching off components comprises a level sensor.

4. The filter according to claim 3, wherein said level sensor is an electrical level sensor.

5. A drilling rig, wherein the drilling rig comprises a filter according to claim 3.

6. The filter according to claim 2, wherein the arrangement for equalizing the pressure of air in an air compartment in the filter comprises an arrangement for the connection of the air compartment in the filter with a corresponding air compartment in the hydraulic tank.

7. A drilling rig, wherein the drilling rig comprises a filter according to claim 2.

8. The filter according to claim 1, wherein the arrangement for equalizing the pressure of air in an air compartment in the filter comprises an arrangement for the connection of the air compartment in the filter with a corresponding air compartment in the hydraulic tank.

9. A drilling rig, wherein the drilling rig comprises a filter according to claim 8.

10. A drilling rig, wherein the drilling rig comprises a filter according to claim 1.

11. A method for the filtration of hydraulic oil in a return line with the aid of a filter, wherein filtration of the hydraulic oil occurs if an oil level in the filter is below a first oil level, and the hydraulic oil is lead bypasses the filter if the oil level in the filter exceeds the first oil level, the steps of said method comprising carrying out a level based bypass arrangement, without causing any significant back pressure by equalizing the air pressure in an air compartment in the filter, and by causing the hydraulic oil to bypass the filter through an opened top without a valve in the filter at or above said first oil level.

12. The method for filtration of hydraulic oil according to claim 11, including at least one of the steps of raising an alarm and switching off components occurs if the oil level in the filter exceeds at least one of the first oil level and a second oil level, or both.

\* \* \* \* \*

UNITED STATES PATENT AND TRADEMARK OFFICE
CERTIFICATE OF CORRECTION

PATENT NO. : 9,776,110 B2
APPLICATION NO. : 13/261246
DATED : October 3, 2017
INVENTOR(S) : Anders Nydahl Page 1 of 1

It is certified that error appears in the above-identified patent and that said Letters Patent is hereby corrected as shown below:

In the Claims

Column 6, Line 34 (Claim 11, Line 4): Delete "is lead".

Signed and Sealed this
Tenth Day of April, 2018

Andrei Iancu
*Director of the United States Patent and Trademark Office*